United States Patent [19]

Gilliard

[11] Patent Number: 5,489,661

[45] Date of Patent: *Feb. 6, 1996

[54] PLIABLE CRYSTALLINE POLYMER

[75] Inventor: Pierre Gilliard, Brussels, Belgium

[73] Assignee: Solvay (Société Anonyme), Brussels, Belgium

[*] Notice: The term of this patent shall not extend beyond th expiration date of Pat. No. 5,306,796.

[21] Appl. No.: 191,918

[22] Filed: Feb. 4, 1994

Related U.S. Application Data

[63] Continuation of Ser. No. 864,545, Apr. 7, 1992, Pat. No. 5,306,796.

[30] Foreign Application Priority Data

Apr. 19, 1991 [BE] Belgium .................. 09100363

[51] Int. Cl.$^6$ ..................... C08F 10/02
[52] U.S. Cl. ............ 526/348.1; 526/351; 526/352
[58] Field of Search ............... 526/348.1, 352, 526/351

[56] References Cited

U.S. PATENT DOCUMENTS

| | | |
|---|---|---|
| 4,551,514 | 11/1985 | Rohn . |
| 4,647,640 | 3/1987 | Capaccio et al. . |
| 4,820,471 | 4/1989 | van der Molen . |
| 4,948,544 | 8/1990 | van Unen et al. . |
| 5,001,206 | 3/1991 | Bashir et al. .................. 526/352 |

FOREIGN PATENT DOCUMENTS 0415783  3/1991  European Pat. Off. .

*Primary Examiner*—David W. Wu
*Attorney, Agent, or Firm*—Spencer, Frank & Schneider

[57] ABSTRACT

An oriented crystalline polymer includes a crystalline polymer which is oriented, preferably above its melting temperature, which is pliable in the absence of any plasticizing adjuvant, and which exhibits a tensile modulus E, measured in the drawing direction, of between 0.3 and 0.8 $E_0$, $E_0$ being the tensile modulus of the same polymer, unoriented.

6 Claims, No Drawings

PLIABLE CRYSTALLINE POLYMER

This is a continuation of application Ser. No. 07/864,545 filed Apr. 7, 1992, now U.S. Pat. No. 5,306,796.

BACKGROUND OF THE INVENTION

1. Field of the Invention

The present invention relates to a pliable crystalline polymer and to a process for its production.

2. Background of the Related Art

Imparting pliability to crystalline polymers especially with a view to permitting the production of articles demanding a certain pliability is generally obtained by an action involving chemistry: action on the degree of short branching or mixing with elastomers or with plasticisers. However, such processes are found to be tricky and costly. Thus, for example, in the polyethylene field, a variety called "VLDPE" is currently produced, which is undoubtedly characterised by a remarkable pliability, but whose cost of manufacture is high.

SUMMARY OF THE INVENTION

It has now been found that it is possible to impart pliability to crystalline polymers solely by physical means, namely, by orienting these polymers under determined conditions which will be specified below.

The present invention consequently relates chiefly to an oriented crystalline polymer which is pliable in the absence of any adjuvant, characterised in that it exhibits a tensile modulus E, measured in the drawing direction, of between 0.3 and 0.8 $E_0$, $E_0$ being the tensile modulus of the same polymer, unoriented.

The oriented and pliable crystalline polymer in accordance with the invention is all the more surprising since it is known that a molecular orientation is reputed to make polymers more rigid.

The oriented and pliable crystalline polymer according to the invention may be of any nature, but it is generally preferred that it should be produced from at least one olefin.

A polymer produced from at least one olefin is intended to denote olefin homopolymers such as especially polyethylene or polypropylene and copolymers containing at least 50% by weight of olefin-derived units.

The oriented and pliable crystalline polymer in accordance with the invention is particularly suited for the production of elongate articles such as reeds, fibres, fills, filaments and the like, which must exhibit good pliability.

The invention also relates to a simple and economical process for producing such an oriented and pliable crystalline polymer.

According to the invention such an oriented and pliable crystalline polymer is obtained by drawing the extruded polymer

- to a deformation ratio higher than 500%,
- at a temperature of between $T_m+10°$ C. and $T_m+30°$ C., $T_m$ being the melting temperature of the polymer, and
- at a mean velocity gradient $\epsilon$ of between $1/20\tau$ and $10/\tau$, $\tau$ being the mean relaxation time of the polymer at the chosen extrusion temperature, and
- by cooling the drawn polymer directly to a temperature below its crystallisation temperature in a time of less than 10 seconds.

The relaxation time of the polymer is defined by the relationship:

$$\tau = \frac{2\eta_0 M_c}{\rho R T}$$

in which:

- $\eta_0$ is the viscosity of the polymer at velocity gradients tending towards 0,
- $\rho$ is the density of the polymer,
- $M_c$ is the critical molecular mass above which $\eta_0$ (in the case of monodisperse polymer) is proportional to the power 3.4 of the molecular mass,
- R and T are the gas constant and the temperature.

In the process in accordance with the invention the polymer must be preferably extruded at a temperature exceeding its melting temperature by approximately 20° C. If need be, a heat exchanger may be placed at the exit of the extruder to bring the polymer to this temperature.

The drawing of the crystalline polymer may be carried out in the extrusion die or by passing the extrudate between two successive and closely adjoining pairs of rolls rotating at different speeds, this being a matter of choice. The Applicant Company generally prefers that the deformation ratio during this drawing should be markedly higher than 500% and even higher than 1000%.

In the process according to the invention the drawn polymer may be cooled rapidly to a temperature below its crystallisation temperature by any conventional means of chilling, such as, for example, passing over a sudden-chill roll. It is preferred, however, that this cooling should be produced by continuous passing through a bath of water maintained at a temperature below 30° C. It is generally preferred that the chilling should be carried out in less than 5 seconds and preferably in less than 2 seconds.

According to another embodiment of the process according to the invention the polymer may be extruded in the form of a parison and, in this case, the drawing is obtained by blowing a gas into the parison.

By virtue of the process according to the invention it is especially possible to obtain elongate articles based on conventional low-density polyethylenes exhibiting a pliability which is analogous to similar articles produced from very low density polyethylenes (VLDPE) or from plasticised polyvinyl chloride.

DESCRIPTION OF THE PREFERRED EMBODIMENTS

The process according to the invention is, furthermore, clarified in greater detail in the examples of practical embodiment which are to follow and in which example 3R, given by way of comparison, is excluded from the scope of the present invention.

Example 1

A low density polyethylene (d=0.920) exhibiting a mean relaxation time of 0.02 s is extruded at a stock temperature of 140° C., by employing an extruder [D(diameter):30 mm, L(length)/D:25, compression ratio 3] equipped with a heat exchanger and a capillary die 2 mm in diameter, 2 cm in length and having an entry angle of 90°. The extrusion speed is 10 m/min, the mean velocity gradient in the convergent entry has a value of 30 $s^{-1}$ and the deformation ratio is 20. The reed thus extruded is then passed through a water bath at 15° C. situated approximately 5 cm from the die exit.

The product thus obtained has a secant tensile modulus at 2% deformation which is 70 MPa (the modulus being measured on a reed 100 mm in length and at a traction speed of 10 mm/min).

By way of comparison, the tensile modulus measured under the same conditions on unoriented reeds drawn as melt (velocity gradient<$\frac{1}{200}\tau$) and cooled slowly, obtained from the same polymer, is 150 MPa. It appears, therefore, that the oriented reed obtained according to the process of the invention has a tensile modulus reduced by approximately 50%.

Example 2

The procedure is as in Example 1, but with an extrusion temperature of 150° C. being chosen, and using a high density polyethylene (d=0.950) which has a relaxation time of 0.1 s, the extrustion speed being 3 m/min.

The product thus obtained has a tensile modulus, measured as in Example 1, of 440 MPa.

By way of comparison, the tensile modulus measured under the same conditions on unoriented reeds drawn as melt (velocity gradient<$\frac{1}{200}\tau$) and cooled slowly, obtained from the same polymer, is, in contrast, 1000 MPa. It again appears that the oriented reed according to the process of the invention has a tensile modulus reduced by approximately 50%.

Example 3R

The procedure is as in Example 1, except that the extrusion speed is reduced to 10 cm/min so as to impose a velocity gradient of 0.3 s$^{-1}$, situated outside the claimed region.

The product thus obtained has a tensile modulus, measured as in Example 1, which is 140 MPa. It appears, therefore, that this product exhibits a modulus comparable to that of an unoriented product (cf. Example 1).

Example 4

The procedure is as in Example 1, except that the distance separating the die from the entry of the cooling bath is increased to 100 cm (cooling time>5 s). The tensile modulus of the reed obtained, measured as in Example 1, is in this case 110 MPa. It is therefore concluded that the product thus obtained, while satisfactory, is less pliable than that obtained according to Example 1. This example consequently shows the advantage of a rapid chilling of the drawn product.

Example 5

The polymer of Example 1 is processed on an extruder (D: 45, L/D: 20, compression ratio 3) equipped with a flat die [g (gap): 4 mm] maintained at 140° C. The deformation velocities in the die are negligible and the film thus produced is very weakly oriented on leaving the die. This film, extruded at a speed of 1 m/min, is then highly drawn between two pairs of press rolls over a distance of 10 cm (mean velocity gradient=5 s$^{-1}$). As it leaves the second pair of rolls, the film is driven at a speed of 20 m/min and has a thickness of 0.5 mm. The film is then immersed directly in a water bath similar to that employed according to Example 1.

The tensile modulus of this film, measured on a specimen according to DIN standard 53457, under the conditions of Example 1, is 90 MPa.

The tensile modulus measured under the same conditions on a specimen cut from a film extruded at 200° C. from the same polymer, drawn as melt at a velocity gradient<$\frac{1}{200}$ and cooled slowly in air, is 190 MPa. It is once again concluded, therefore, that the film produced according to the process of the invention has a tensile modulus reduced by approximately 50%.

What is claimed is:

1. An oriented crystalline polymer, comprising:
a crystalline polymer which is oriented above its melting temperature, which is pliable in the absence of any plasticizing adjuvant, and which exhibits a tensile modulus E, measured in the drawing direction, of between 0.3 and 0.8 $E_0$, $E_0$ being the tensile modulus of the same polymer, unoriented.

2. The oriented crystalline polymer according to claim 1, wherein the crystalline polymer is at least one olefin homopolymer or copolymer containing at least 50% by weight of olefin-derived units.

3. The oriented crystalline polymer according to claim 2, wherein said at least one olefin is an olefin homopolymer.

4. The oriented crystalline polymer according to claim 3, wherein said olefin homopolymer is polyethylene.

5. The oriented crystalline polymer according to claim 3, wherein said olefin homopolymer is polypropylene.

6. The oriented crystalline polymer according to claim 2, wherein said at least one olefin is a copolymer containing at least 50% by weight of olefin-derived units.

* * * * *